United States Patent [19]

Viets

[11] Patent Number: 5,048,998
[45] Date of Patent: Sep. 17, 1991

[54] COMPRESSION-LOCKING CLAMPING BUSH SYSTEM

[76] Inventor: Adalbert Viets, Pasteur Promenade 9, 6600, Saarbruecken, Fed. Rep. of Germany

[21] Appl. No.: 347,463

[22] Filed: May 4, 1989

[30] Foreign Application Priority Data

May 7, 1988 [DE] Fed. Rep. of Germany ....... 3816688

[51] Int. Cl.$^5$ ............................................. F16B 7/04
[52] U.S. Cl. .................................. 403/351; 403/367
[58] Field of Search ............... 403/351, 350, 352, 367, 403/365, 282

[56] References Cited

U.S. PATENT DOCUMENTS

| 1,481,062 | 1/1924 | Johnson | 403/351 X |
|---|---|---|---|
| 3,368,834 | 2/1968 | Stratienko | 403/352 |
| 3,515,418 | 8/1970 | Nielsen, Jr. | 403/352 X |
| 3,924,957 | 12/1975 | Camosso | 403/352 |
| 3,938,901 | 2/1976 | Howe, Jr. | 403/350 |
| 4,006,993 | 2/1977 | Woerlee | 403/365 X |
| 4,076,437 | 2/1978 | Mazzolla | 403/350 |
| 4,139,317 | 2/1979 | Hafner | 403/352 |
| 4,585,367 | 4/1986 | Gall | 403/351 X |
| 4,738,561 | 4/1988 | Roltger | 403/351 X |

Primary Examiner—Peter M. Cuomo
Attorney, Agent, or Firm—John A. Frazzini

[57] ABSTRACT

A hub-to-shaft coupling, without any key or keyway, having a pair of coaxial bushings which can be rotated relative to one another. In a first relative angular position, the inner bushing fits loosely within the outer bushing. In a second relative position, the bushings deform one another, pushing the inner bushing against the shaft and the outer bushing against the hub, thereby locking the shaft to the hub. The hub can be unclamped from the shaft without damage to the shaft or hub by rotating the bushings relative to one another back to the first angular position.

13 Claims, 4 Drawing Sheets

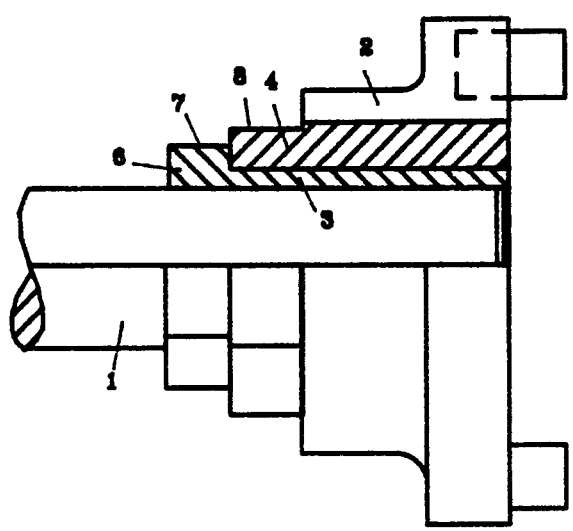
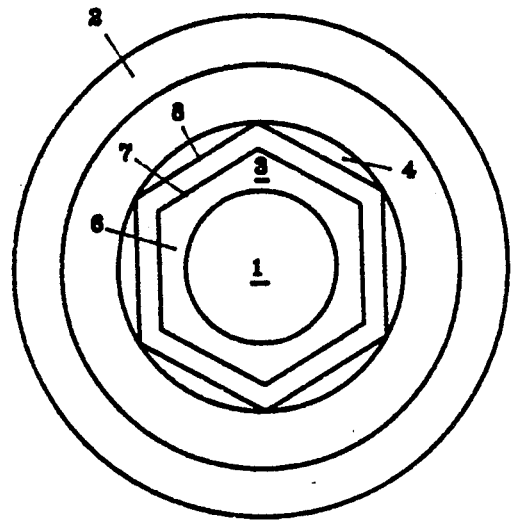
Figure 1
Figure 2
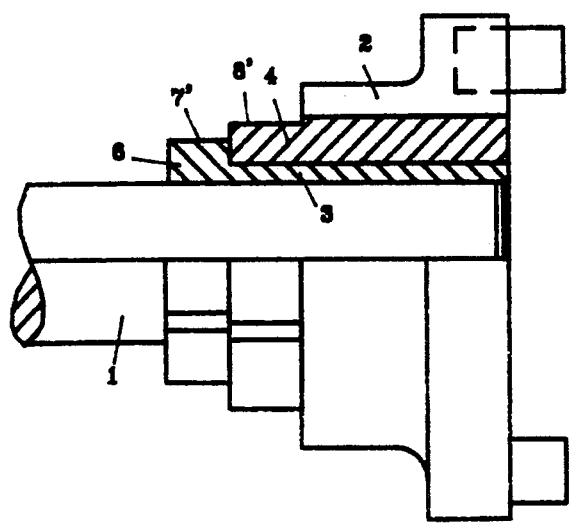
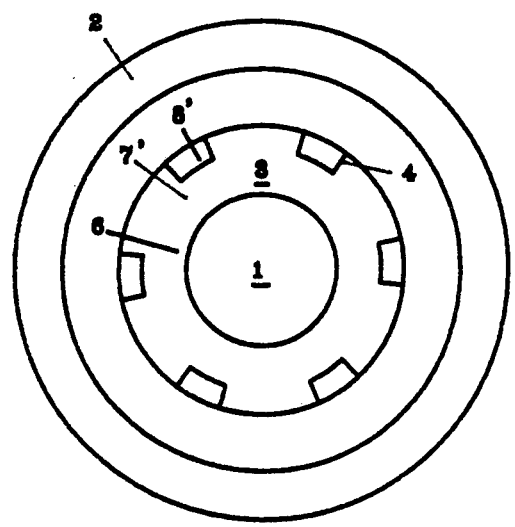
Figure 3
Figure 4

COMPRESSION-LOCKING CLAMPING BUSH SYSTEM

BACKGROUND OF THE INVENTION

In the Figures, the same element in different figures will be indicated by the same reference numeral. Closely related elements will be designated by the same reference numeral, but with differing numbers of primes on that numeral.

This invention relates in general to hub-to-shaft couplings and relates more particularly to a clamping bush that reversibly locks a hub to a shaft by means of a reversible compression fit. By a "hub" is meant any element that has a cylindrical bore therethrough. Typically, the hub is part of a disc, wheel, lever arm or similar component and functions to attach such component to the shaft. By a "shaft" is meant any cylindrical bar. Usually, but not always, the shaft will have a circular cross-section in a plane normal to the axis of the shaft and the hub will be cylindrically balanced to rotate about the center of its cylindrical bore without producing a significant amount of wobble. By a "bushing" is meant a removable lining for a shaft.

In general, hub-to-shaft couplings are used to transfer torque between the shaft and the hub. In an early hub-to-shaft coupling, a square shaft was fitted into a substantially equal size square opening in a hub. In a subsequent hub-to-shaft coupling, a circular shaft was fitted into a substantially equal size circular hole in a hub. A flat or tapered key is forced between the shaft and hub to firmly wedge between the shaft and the hub and enable torque to be transmitted between the shaft and hub. A common hub-to-shaft coupling utilized today employs a key in a keyway formed in the shaft and hub to prevent rotation of the hub relative to the shaft. Such a key/keyway system can involve a cylindrical shaft having a rectangular cross-section fitted within a rectangular keyway that extends into both the shaft and hub. A splined shaft and associated splined bore in the hub as used in the automotive gear and in the machine tool industry is another example of the key/keyway type hub-to-shaft couplings.

Despite the decade long use of such couplings, a key/keyway type hub-to-shaft coupling has many disadvantages that has led to many attempts to replace it by a better system. The main disadvantage of the key/keyway system is the notch sensitivity of both the hub and shaft. To avoid this sensitivity, both components are often overdimensioned. However, this results in shafts that are larger than necessary for transmitting the torque, resulting in excessive weight of parts, including components attached to the hub and shaft, such as brake drums, brake discs, flywheels, gear wheels and couplings.

In key/keyway type couplings, the machinery user runs the risk of sudden machine failure whenever peak torques occur that exceed the design limits. Such design limit can be exceeded as the result of shocks, such as can be delivered by a drive train. Also, under repeated peak load operation, clearance between the sides of the key and the keyway leads to irregular dynamic operation such as problems with speed control and can result in damage to the hub-to-shaft coupling and the entire drive system.

Another hub-to-shaft coupling called the K-profile is similar to the square shaft embodiment mentioned above, except that the cross-section of the hub is triangular. Unfortunately, this coupling is expensive and requires the close sliding fit that is needed in the splined hub-to-shaft coupling discussed above.

Shrinkage fit type hub-to-shaft couplings avoid many of the problems discussed above. In such embodiments, the outer member can be heated temporarily to let it slip over the inner member or the inner member can be cooled to let the outer member slip over it. After both members reach ambient conditions, there will be a tight fit between these two members. This approach avoids the excessive material requirements and notch sensitivity discussed above for the key/keyway type hub-to-shaft couplings. However, shrinkage fit couplings are hard to unlock and can be destroyed during disassembly. Implementing the shrinkage fit requires great skill. If the wrong temperature is utilized, the shaft and hub can get stuck before being properly aligned. Even when this process is carefully performed by skilled worker, some components can be destroyed.

The hydraulic fit system is easier to handle, but requires the expensive machining of oil ducts into the components. These oil ducts include a threaded portion that is adapted to receive a threaded pressure hose to force oil between the shaft and hub. This hub is coupled to the shaft by a shrink fit method as discussed above. The hub can be removed from the shaft by forcing oil into the ducts to expand the hub away from the shaft, enabling it to be slipped off of the shaft. Unless special tools are used, heating of parts is still necessary. However, dismantling of the coupling is at least possible without major problems.

In another type of shrinkage fit system, single or double wedge-type rings are utilized either to clamp the hub to the shaft from the outside of the hub, to clamp the hub to the shaft from the inside of the bore of the hub or to clamp the hub to the shaft with a conical sleeve that is hydraulically pressed axially into the gap between the shaft and hub. All of these systems require a large number of bolts, are complicated, are expensive and require skill for proper (especially concentric) positioning of the components. The tapered bush coupling must also be of the key/keyway type coupling if it is to be used in the upper torque range of its design specifications.

In the automotive industry, it is also known to use hydraulic expansion of components such as the cam and cam shaft. However, such an approach requires a shaft having an internal bore and is an expensive, high precision process. Also, the shrinkage is irreversible so that these parts cannot be easily disassembled.

In the double-wall bushing type hub-to-shaft coupling, one end of the bush is welded shut and the other end remains open to receive an annular piston for compressing plastic fill between the walls. This compression expands the bush in both radial directions so that it presses against both the shaft and the hub. Annular piston bolts are required to maintain this pressure within the bushing. However, the pressure within this bush can decrease with time, thereby losing the clamping effectiveness. This type of clamp is relatively bulky and therefore requires more material and produces more inertial loading of the shaft than is desirable.

All of the clamping type systems discussed above that use conical elements are relatively large. They require a large amount of space for fitting and dismantling as well as to accommodate the external rings utilized in some embodiments to clamp the hub to the shaft.

An expanding mandrel can be used to clamp a hub to a shaft, but it requires an inner bore to house the central spindle and the cones that are threaded internally to expand the slotted outer housing of the mandrel and it is typically too long to be used effectively as a hub-to-shaft coupling.

SUMMARY OF THE INVENTION

In accordance with the illustrated preferred embodiments, a hub-to-shaft coupling is presented that avoids the above-described disadvantages of prior couplings, is inexpensive and is easy to lock into place and to unlock. This hub-to-shaft coupling utilizes a pair of coaxial cylindrical bushings having cross-sections (in a plane perpendicular to the axes of these bushings) such that in a first relative angular rotation of these bushings, the bushings easily slide within one another and in a second relative angular rotation of these bushings deform one another sufficiently to press inward and outward, thereby locking the hub to the shaft.

The deformation is not uniform over the circumference interface between the bushings and therefore does not produce a circumferentially uniform pressure against the shaft and hub. However, the pressure is sufficient for transmitting peak torques comparable to those provided by shrink fit couplings. This coupling is therefore suitable for a broad range of applications including use in clamp discs, cranks, gear wheels and couplings.

The simplicity of the design provides a number of advantages. The hub and shaft are centered by this coupling about a common axis of rotation so that this coupling does not introduce wobble into the system when the shaft is rotated. The design is simple and requires no bolts so that the number of parts is small (i.e., the two bushings). The maximum radial diameter of the coupling is relatively small so that it contributes a relatively small moment of inertia to the coupled system. Positioning of the components to be clamped doesn't depend on shaft shoulders or gib rings and yet can easily be accurately located at a preselected axial position. This coupling can be easily unlocked, without damage to any of the parts, to allow removal of the hub from the shaft. The total length of the coupling need not significantly exceed the length of the hub. The small number of components and the simple design make this an inexpensive coupling that requires no keyways or associated fitted keys.

Particular illustrative embodiments include embodiments in which the outer surface of the inner bushing and the inner surface of the outer bushing have the shape of the perimeter of a single ellipse or a plurality of overlapping ellipses having noncoincident foci. The pattern of the perimeter for the case of n overlapping ellipses is selected to have an n-fold rotational symmetry so that this coupling centers the hub on the shaft. It is advantageous for the inner surface of the outer bushing to have substantially the same shape, but slightly larger scale than the outer surface of the inner bushing so that the bushings are readily aligned when the inner bushing is inserted into the outer bushing. As the bushings are rotated relative to one another, at least two portions of the outer surface of the inner bushing come into contact with the inner surface of the outer bushing. The gap and ellipticity are selected so that further relative rotation results in plastic deformation of both bushings, thereby producing a pressure fit of the inner bushing against the shaft and a pressure fit of the outer bushing against the hub. The dimensions are selected so that, for a pair of bushings having n-fold symmetry, the maximum range of relative rotation is significantly less than 360°/n. The very small difference in scale of the mating surfaces of the bushings produces the advantage of secure locking even when subjected to sudden torsional shocks and reverse impulses. This safe locking results from the small relative angle between the inner surface of the outer bushing and the outer surface of the inner bushing for the same reason that threaded bolts with small thread pitch are more secure against vibration than are bolts with a large thread pitch.

To enable forcible relative rotation of the bushings to lock the hub to the shaft, an end of each of the bushings contains a mechanism suitable for applying torque to each of the bushings. Such mechanism can take many forms including the form of a hexagonal nut, a slotted nut or a gear rim to enable use of an open end wrench, a spanner and/or a drive gear to provide rotation of each of these bushings.

To facilitate axial sliding of the hub after unlocking, the maximum diameter of the end nut is smaller than the minimum diameter of the inner surface of the outer bushing.

To improve clamping, the bushes can be made of a material with a low coefficient of friction and/or a low rate of corrosion of this coefficient of friction so that the ability to unlock the coupling is retained over extended time periods. Such corrosion occurs largely as a result of friction between the components as the result of vibration that accompanies use of these devices. A low rate of corrosion of the coefficient of friction prevents the amount of peak torque that the coupling can sustain without unlocking from either decreasing with time, thereby making the coupling prone to unlocking during use, or increasing with time, thereby making it increasingly difficult or impossible to unlock the coupling when such becomes necessary or desirable. A low coefficient of friction reduces the applied torque between the two bushings needed to clamp the hub to the shaft. This reduced friction for a give torque lets the bushings slide farther about one another, thereby producing a greater amount of deformation of the bushings.

In some embodiments, the wall of one or both bushings are slotted with one or more slots to increase the ease of deforming the bushings so that they press against the shaft and the hub. These slots can be parallel to the axis of the bushings or can be angled such that they are helical in shape. These slots can extend the full length of the bushing or only part of the length and can extend entirely through the wall of the bushing or only part way through. Helical slots have the advantage of distributing the deformation of the bushings more uniformly over the entire bushing.

DESCRIPTION OF THE FIGURES

FIG. 1 illustrates a first embodiment of the hub-to-shaft coupling. The top half of this coupling is shown in cross-section and the bottom half is shown in side view.

FIG. 2 shows an end view of the coupling of FIG. 1 as seen from the left of that Figure and illustrates a pair of end nuts used to apply torque to the two bushings to produce relative rotation between the bushings.

FIG. 3 is the same as FIG. 1 except that slotted nuts are utilized on the ends of the bushings.

FIG. 4 shows an end view of the coupling of FIG. 3 as seen from the left of that Figure and illustrates the pair of slotted end nuts used to apply torque to the two bushings to produce relative rotation between the bushings.

DESCRIPTION OF THE PREFERRED EMBODIMENTS

Figure 5:
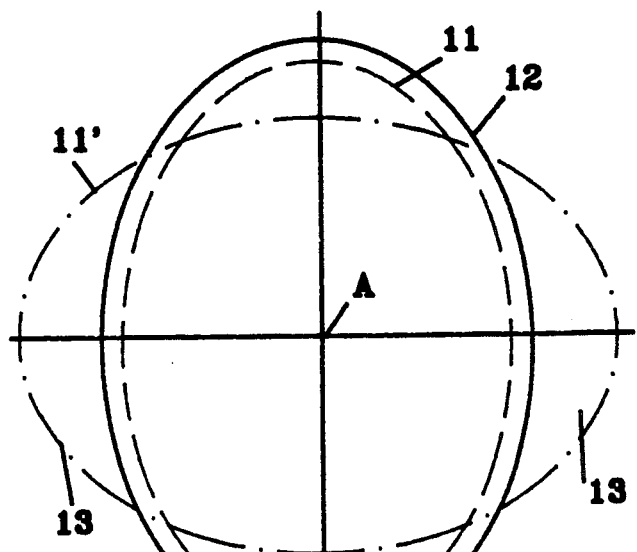
FIG. 5 illustrates the invention for the case of bushings having an elliptical cross-section in a plane perpendicular to the axis of the cylindrical bushings.

In FIGS. 1 and 2 are side and end views of a hub-to-shaft coupling consisting of a cylindrical inner bushing 3 and a cylindrical outer bushing 4 to lock a hub 2 to a shaft 1. One end of inner bushing 3 consists of a reinforcing ring 6 that includes a hexagonal nut 7. One end of outer bushing 4 consists of a reinforcing ring that includes a hexagonal nut 8. Nuts 7 and 8 can be on the same ends of bushings 3 and 4 or can be on opposite ends. These nuts can be molded as part of their respective bushings or can be welded or brazed on to their respective bushings.

FIGS. 3 and 4 are substantially the same as FIGS. 1 and 2, respectively, except that hexagonal nuts 7 and 8 are replaced by slotted nuts 7' and 8'. Bushings 3 and 4 are rotated relatively to one another by use of a pair of open end wrenches, each inserted over one of nuts 7 and 8 in the case of FIGS. 1 and 2 or by use of a pair of spanners, each of which is inserted into the slots of one of nuts 7' and 8 in the case of FIGS. 3 and 4.

Figure 6:
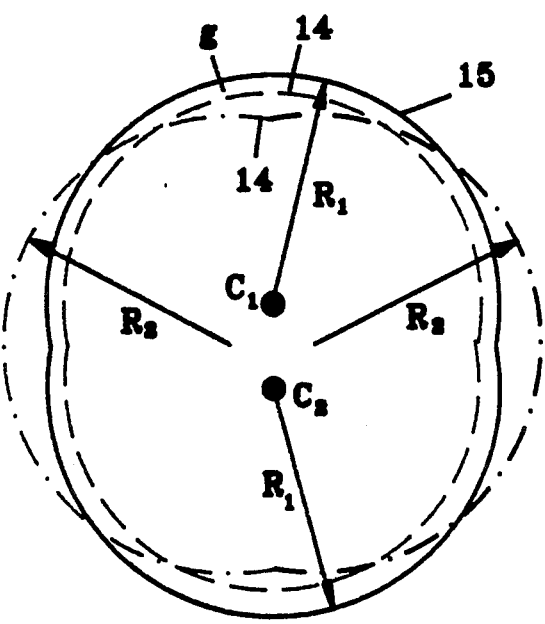
FIG. 6 illustrates the inventin for the case of bushings having a cross-section, in a plane perpendicular to the axis of the cylindrical bushings, that has a 2-fold rotational symmetry.
Figure 7:
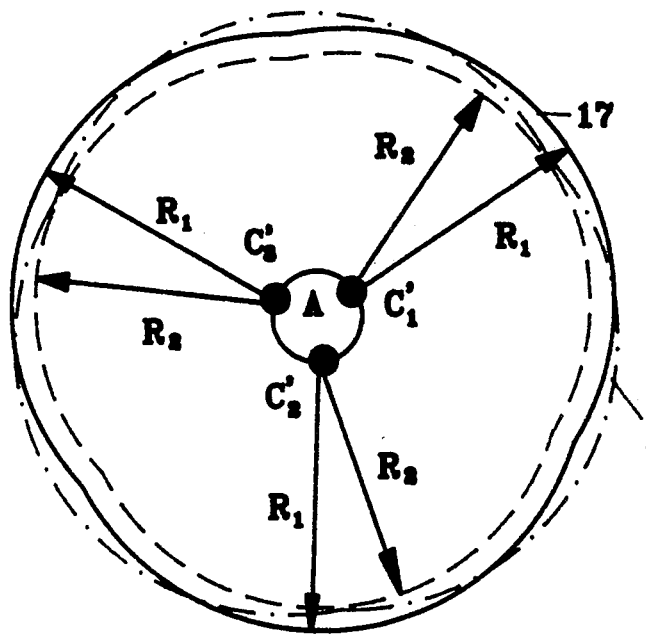
FIG. 7 illustrates the invention for the case of bushings having a cross-section, in a plane perpendicular to the axis of the cylindrical bushings, that has a 3-fold rotational symmetry.

Clamping of hub 2 to shaft 1 is produced by relative rotation of bushings 3 and 4 as illustrated in FIGS. 5-7 for three different embodiments of the invention. In FIG. 5, bushings 3 and 4 both have an elliptical cross-section in a plane perpendicular to a common axis A of both bushing. These figures illustrate the importance of the cross-sectional shapes of the inner surface of the outer bushing and the outer surface of the inner bushing.

In FIG. 5, the outer surface 11 of inner bushing 3 and the inner surface 12 of outer bushing 4 each have an elliptical cross-section. These elliptical cross-sections have substantially the same ellipticity $\epsilon$ but slightly different scales (i.e., slightly different major axis lengths). This small difference in scale produces a small gap g between the surfaces 11 and 12 when their major axes are substantially parallel. The size of gap g is selected to be large enough that it is not difficult to insert bushing 3 into bushing 4, but is also kept as small as possible within this constraint so that the bushings will align with nearly concentric axes. Dashed line 11' illustrates surface 11 when bushing 3 is rotated by $\pm 90°$ relative to bushing 4. In this orientation, a pair of sickle shaped portions 13 of inner bushing 3 extend past the inner surface 12 of outer bushing 4. To be able to rotate bushing 3 to this relative orientation, inner bushing 3 and/or outer bushing 4 must deform to keep outer bushing surface 12 outside of inner bushing surface 11. The thickness and tensile strength of both bushings are selected so that both bushings deform such that inner bushing 3 is pressed against shaft 1 sufficiently hard to lock that bushing to shaft 1 and to outer bushing 4, and such that outer bushing 4 is pressed against hub 4 sufficiently hard to lock that bushing to hub 2. The amount of relative torque applied between these two bushings is greater than the peak torque to be applied beween shaft 1 and hub 2 so that these bushings will lock the hub to the shaft over the operating range of torques to be experienced between the shaft and hub. The relative torque applied between the bushing to clamp the hub to the shaft is typically on the order of three times the peak torque that this coupling is designed to withstand. The thickness and tensile strengths of bushings 3 and 4 are also selected so that the amount of relative rotation needed to lock hub 2 to shaft 1 is significantly less than 90°. This prevents a slight amount of over tightening from actually loosening the lock between the shaft and the hub.

FIG: 6 illustrates an embodiment in which inner bushing 3 has an outer surface 14 of the shape of the perimeter of two overlapping ellipses (in this particular embodiment, the two overlapping ellipses are actually two circles centered on points $C_1$ and $C_2$). Outer bushing 4 has an inner surface 15 of substantially the same shape as surface 14, but slightly greater scale so that a gap g exists between surfaces 14 and 15 when bushing 3 is inserted into bushing 4. For surface 14, the circles have radius $R_1$ and for surface 15, the circles have radius $R_2$ slightly greater than $R_1$. Surface 14 again has a 2-fold rotational symmetry about rotation axis A. The 2-fold rotational symmetry of these bushings ensures that, when in locked engagement, both bushing have the same rotation axis so that the rotation axis of hub 2 coincides with the rotation axis of shaft 1 so that the hub does not try to wobble upon rotation about axis 1.

FIG. 7 illustrates an embodiment in which the inner bushing has an outer surface 16 having 3-fold symmetry consisting of portions of three circles cnetered at three points $C_1$, $C_2$ and $C_3$ which are each equidistant from axis a and are angularly spaced about axis A by 120°. The outer bushing has an inner surface 17 of substantially the same shape, but slightly greater scale, as surface 16. In this embodiment, having 3-fold symmetry, there will be three regions of contact between the outer surface of inner bushing 3 and the inner surface of outer bushing 4. For such surfaces having n-fold symmetry, there will be n regions of contact.

The bushes are preferably made of steel or sintered steel. The surface can be improved by a hard chrome coating or chemical nickel coating to reduce the tendency of the two bushings to corrode together and thereby prevent unlocking of the coupling.

Figure 9:
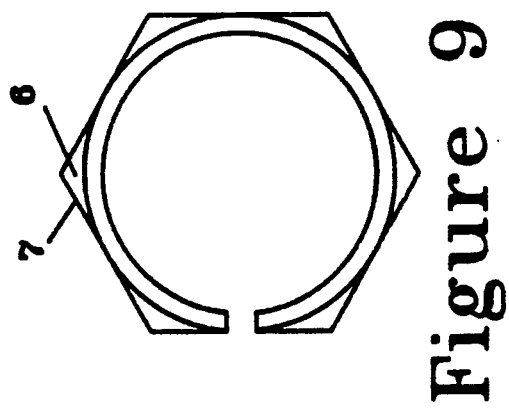
FIG. 9 is an end view of the bushing of FIG. 8.
Figure 10:
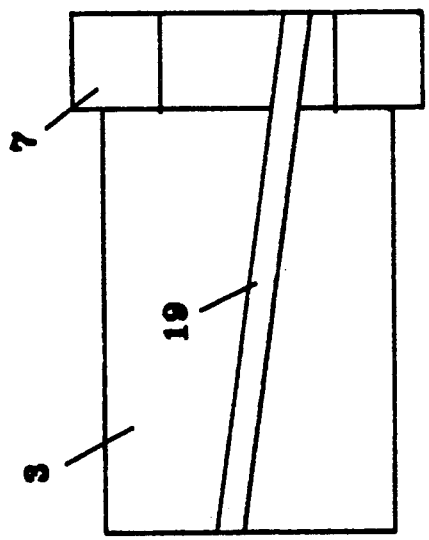
FIG. 10 shows a side view of a bushing with hexagonal end nut and a helical slot that extends completely through the wall of the bushing the entire length of the bushing.
Figure 8:
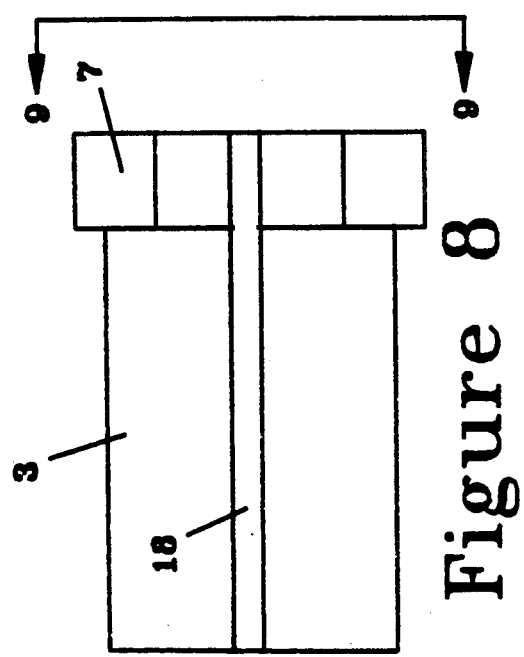
FIG. 8 shows a side view of a bushing with hexagonal end nut and a slot that extends completely through the wall of the bushing the entire length of the bushing.

As illustrated in FIG. 8-10, one or more slots can be formed part way or completely through the wall of one or both bushings to make deformation of that bushing easier. The slot can be parallel to axis A of the bushing as illustrated in FIGS. 8 and 9 or can be a helical shaped slot in the bushing as illustrated in FIG. 10.

I claim:

1. A hub-to-shaft coupling for attaching a hub, having a cylindrical bore, to a cylindrical shaft, said coupling comprising:

a unitary outer bushing being mounted within said bore of said hub and having an inner surface that bounds an inner bore of said outer bushing, said inner surface, in a plane perpendicular to an axis of the outer bushing, having a shape of an outer perimeter of at least one overlapping ellipse;

a unitary inner bushing being mounted within said inner bore of said outer bushing and having an outer surface and also having an inner surface that bounds a cylindrical bore which receives said shaft, said outer surface, in a plane perpendicular to an axis of the inner bushing, having a shape of an outer perimeter of at least one overlapping ellipse;

each of said inner and outer bushings having a cross-section in a plane normal to an axis of its respective bore such that in a first relative angular orientation of said bushings about said shaft, the inner bushing fits within the outer bushing and in a second relative angular orientation of these bushings about said shaft, the inner bushing deforms radially inward toward its axis of its cylindrical bore and the outer bushing deforms radially outward from its axis of its inner bore, whereby, in the second relative angular orientation, said coupling clamps the hub to the shaft by elastically deforming the unitary outer bushing outwardly to press against the hub and by elastically deforming the unitary inner bushing inwardly to press against the shaft.

2. A coupling as in claim 1 wherein the inner surface of the outer bushing has, in a plane perpendicular to the axis of the outer bushing, a substantially elliptical shape and the outer surface of the inner bushing has, in a plane perpendicular to the axis of the inner bushing, a substantially elliptical shape.

3. A coupling as in claim 1 wherein the inner surface of the outer bushing and the outer surface of the inner bushing each has, in a plane perpendicular to the axis of that bushing, substantially the shape of the outer perimeter of n overlapping ellipses, where n is an integer greater than 1.

4. A coupling as in claim 3 wherein said outer perimeter of n overlapping ellipses has n-fold symmetry, whereby said coupling locks said hub coaxially on said shaft.

5. A coupling as in claim 1 wherein each of said bushings further comprises means for applying torque between said bushings to produce forcible rotation of one of said bushings relative to the other to be able to reversibly clamp the hub to the shaft.

6. A coupling as in claim 5 wherein said means for applying torque comprises a hexagonal nut formed on an end of each bushing, thereby enabling relative rotation by means of a pair of open end wrenches.

7. A coupling as in claim 6 wherein said nut on the end of the inner bushing fits entirely within the inner surface of the outer bushing 8. A coupling as in claim 5 wherein said means for applying torque comprises a slotted nut on an end of each bushing, thereby enabling relative rotation by means of a pair of spanners.

9. A coupling as in claim 8 wherein said nut on the end of the inner bushing fits entirely within the inner surface of the outer bushing.

10. A coupling as in claim 1 wherein said inner surface of the outer bushing and said outer surface of the inner bushing are both noncorrosive, whereby said coupling will retain over time its ability to be unlocked without damage to the hub or shaft.

11. A coupling as in claim 10 wherein at least one of the bushings contains a slot along a side of said at least one bushing, thereby increasing the ability of said at least one bushing to deform when the bushings are rotated relative to one another.

12. A coupling as in claim 11 wherein the slot is substantially parallel to the axis of said at least one bushing.

13. A coupling as in claim 11 wherein the slot is helically shaped in said at least one bushing.

* * * * *